United States Patent
Lee et al.

(10) Patent No.: US 8,503,012 B2
(45) Date of Patent: Aug. 6, 2013

(54) HOST APPARATUS CONNECTED TO IMAGE FORMING APPARATUS AND WEB PAGE PRINTING METHOD THEREOF

(75) Inventors: Hee-ran Lee, Seoul (KR); Hyung-jong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 444 days.

(21) Appl. No.: 12/645,911

(22) Filed: Dec. 23, 2009

(65) Prior Publication Data

US 2010/0157366 A1 Jun. 24, 2010

(30) Foreign Application Priority Data

Dec. 24, 2008 (KR) ........................ 10-2008-0133041

(51) Int. Cl.
*G06F 15/00* (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS

| | | | |
|---|---|---|---|
| 6,351,767 B1 | 2/2002 | Batchelder et al. | |
| 6,810,414 B1 | 10/2004 | Brittain | |
| 6,856,415 B1 | 2/2005 | Simchik et al. | |
| 7,315,848 B2 | 1/2008 | Pearse et al. | |
| 7,325,188 B1 | 1/2008 | Covington et al. | |
| 7,934,152 B2 | 4/2011 | Krishnamurthy et al. | |
| 2003/0101412 A1 | 5/2003 | Eid | |
| 2004/0019611 A1 | 1/2004 | Pearse et al. | |
| 2005/0091186 A1 | 4/2005 | Elish | |
| 2006/0174199 A1* | 8/2006 | Soltis et al. | 715/700 |
| 2006/0290976 A1* | 12/2006 | Ko et al. | 358/1.15 |
| 2007/0106952 A1 | 5/2007 | Matas et al. | |
| 2007/0124670 A1* | 5/2007 | Finck et al. | 715/526 |
| 2008/0094669 A1* | 4/2008 | Imai | 358/452 |
| 2008/0307301 A1 | 12/2008 | Decker et al. | |
| 2008/0307308 A1 | 12/2008 | Sullivan et al. | |
| 2009/0193336 A1* | 7/2009 | Ko et al. | 715/274 |
| 2009/0310168 A1* | 12/2009 | Kunioka et al. | 358/1.15 |
| 2010/0044810 A1 | 2/2010 | Eriksen et al. | |
| 2011/0264793 A1 | 10/2011 | Goldman et al. | |

FOREIGN PATENT DOCUMENTS

| | | |
|---|---|---|
| KR | 2008-30328 | 4/2008 |
| WO | 01/16803 | 3/2001 |

OTHER PUBLICATIONS

EP Search Report issued Aug. 9, 2011 in EP Patent Application No. 11162383.1.
Office Open XML, Part 2: Open Packaging Conventions, Dec. 2006.
European Search Report Issued on Jul. 6, 2012 in EP Patent Application No. 12162759.0.
European Search Report Issued on Jul. 6, 2012 in EP Patent Application No. 09178103.9.
U.S. Office Action Issued on Jun. 21, 2012 in U.S. Appl. No. 13/084,673.
United States Final Office Action dated Dec. 5, 2012 issued in U.S. Appl. No. 13/084,673.

\* cited by examiner

*Primary Examiner* — Saeid Ebrahimi Dehkordy
(74) *Attorney, Agent, or Firm* — Stanzione & Kim, LLP

(57) ABSTRACT

A host apparatus connected with an image forming apparatus and a web page printing method thereof. The method of printing a displayed web page includes capturing at least one area on the displayed web page, displaying the at least one captured area in a first area disposed adjacent to the displayed web page, editing the at least one captured area displayed in the first area, and executing the at least one captured and edited area. With this, it is convenient for a user to select, edit and print a desired area from a web page.

20 Claims, 8 Drawing Sheets

HOST APPARATUS CONNECTED TO IMAGE FORMING APPARATUS AND WEB PAGE PRINTING METHOD THEREOF

CROSS-REFERENCE TO RELATED APPLICATIONS

This application claims priority under 35 U.S.C. §119(a) from Korean Patent Application No. 10-2008-0133041, filed on Dec. 24, 2008 in the Korean Intellectual Property Office, the disclosure of which is incorporated herein in its entirety by reference.

BACKGROUND

1. Field of the Invention

The present general inventive concept relates to a host apparatus to connect with an image forming apparatus and a web page printing method thereof, and more particularly, to a host apparatus to connect with an image forming apparatus and a web page printing method thereof, which can edit and print a predetermined area selected from a web page.

2. Description of the Related Art

With widespread high-speed Internet service, various web environments are provided and thus a user can view a lot of information through web pages.

Under such various web environments, a user can collect plenty of information through the web pages and print the information for practical use.

To print a web page, a user generally selects a print menu on a web browser and enters printing with respect to the web page.

However, most of the web pages are designed without regard to completeness when printed, so that when using the foregoing printing function provided by the web browser, information desired by a user may be omitted due to a partial printing cut on the page, or an undesired page may be printed.

Although the web browser provides an edit function for allowing a user to edit a margin, an orientation, a head, a tail, etc. when selecting page settings to thereby prevent the information from being omitted or the undesired page from being printed, a user has difficulty in ascertaining whether the printing is performed as desired through a preview, and so on.

In the meantime, there have recently been provided applications for selecting a portion the web page to be printed or storing the web page to have a file format such as a portable document format (PDF).

However, such applications cause the selected portions of the web page to be printed as a unit of hyper text markup language (HTML) object having a stack structure, and therefore not only an undesired portion may be selected to be printed but also restrictions are imposed on the selected portion.

SUMMARY

Accordingly, exemplary embodiments of the present general inventive concept provide a host apparatus to connect with an image forming apparatus, which is convenient for a user to select a desired area from a web page to edit and print it, and a web page printing method thereof.

Additional aspects and utilities of the present general inventive concept will be set forth in part in the description which follows and, in part, will be obvious from the description, or may be learned by practice of the general inventive concept.

Exemplary embodiments of the present general inventive concept also provide a host apparatus to connect with an image forming apparatus, which is convenient for a user to ascertain an edited state of a web page through a screen division without a separate operation such as selecting a preview or the like, and edit the web page as desired, and a web page printing method thereof.

Exemplary embodiments of the present general inventive concept can be achieved by providing a method of printing a displayed web page, the method including capturing at least one area on the displayed web page being, displaying the at least one captured area a first area displayed adjacent to the displayed web page, editing the at least one captured area displayed in the first area, and executing the at least one captured and edited area.

The capturing the at least one area may include adding the captured area to the first area by dragging and dropping or by selecting a content menu of moving the captured area to the first area.

The first area may also include a page area including the at least one captured area, and a menu area including at least one selectable menu item for editing the captured area. The first area may be hidable from view.

The method may further include displaying a printing page including the captured and edited area as a full screen.

The executing the at least one captured and edited area may include performing at least one of printing, saving, transmitting to e-mail, sending to fax, sending to a communication network, and sending to a file transfer protocol (FTP) host.

Also, the executing the at least one captured and edited area may include selecting at least one printing page among printing pages including the at least one captured area.

The method may further include selecting the captured area displayed in the first area and displaying a web site corresponding to the selected captured area.

Exemplary embodiments of the present general inventive concept also provide a host apparatus connectable with an image forming apparatus, including a communication unit to communicate with the image forming apparatus, a display unit to display a web page, a user interface to receive a selection of at least one area to be captured on the displayed web page, and to edit the captured area, and a controller to control the display unit to display the at least one captured area boarding a first area, and the communication unit to transmit printing data including the at least one captured and edited area to the image forming apparatus.

The user interface may receive a selection to add the captured area to the first area by dragging and dropping or by receiving a selection of a content menu item to move to the first area.

The first area may include a page area having the at least one captured area, and a menu area including at least one menu item to edit the captured area. The scrap board may be hidable from view.

The display unit may display a printing page including the captured and edited area as a full screen.

The host apparatus may further include a storage unit, wherein the controller may store the captured area in the storage unit or may control the communication unit to communicate at least one of a print operation, a save operation, a transmit operation, a send to email operation, a send to fax operation, a send operation to a communication network, and a send operation to a file transfer protocol (FTP) host.

The user interface may also receive a selection of at least one printing page among printing pages including the at least one captured area.

The user interface may also receive a selection of the captured area displayed in the first area, and the display unit may display a web site corresponding to the selected captured area.

Exemplary embodiments of the present general inventive concept may also provide a method of printing at least a portion of a displayed web page, the method including receiving a selection of at least one area of the displayed web page, displaying the at least one selected area in a first area of a display, editing the at least one selected area displayed in the first area, and printing the at least one edited selected area that is displayed in the first area.

Exemplary embodiments of the present general inventive concept may also provide a web page printing system, including a host apparatus having a communication unit to transmit printing data, a display unit to display a web page, a user interface to receive a selection of at least one area to be captured on the displayed web page, and to edit the captured area, and a controller to control the display unit to display the at least one captured area in a first area, and to control the communication unit to transmit printing data comprising the at least one captured and edited area to the image forming apparatus, and an image forming apparatus to receive the printing data from the host apparatus, and to print the printing data.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
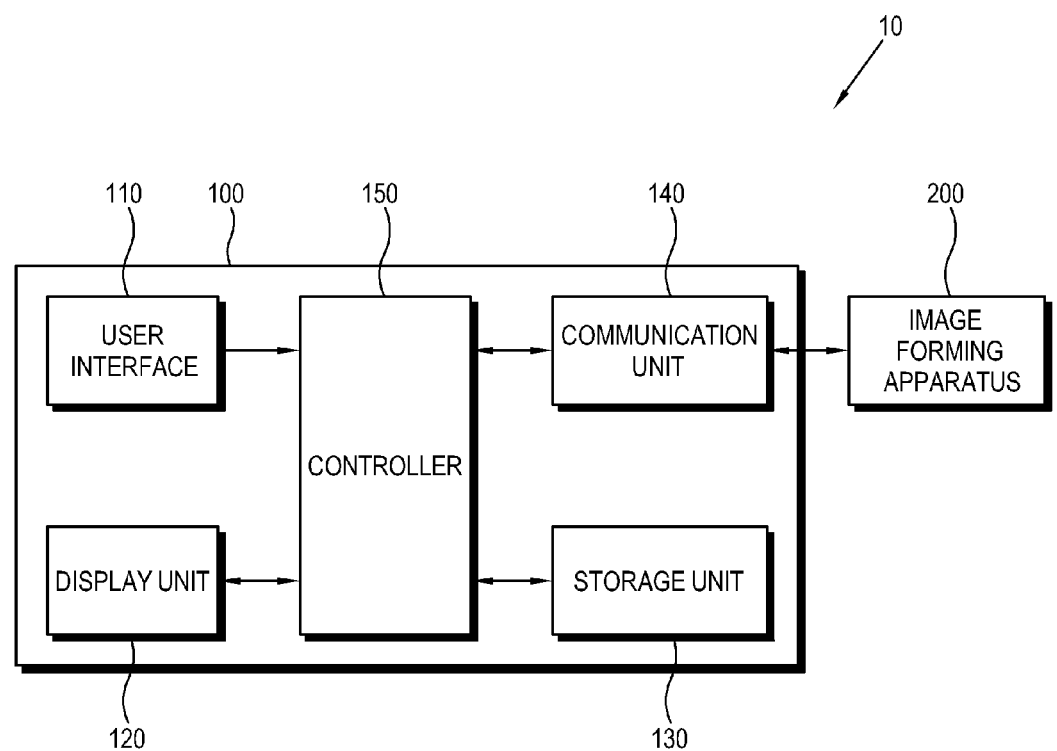
FIG. 1 is a block diagram illustrating a host apparatus according to exemplary embodiments of the present general inventive concept.

Reference will now be made in detail to the exemplary embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a system 10 including a host apparatus 100 according to exemplary embodiments of the present general inventive concept.

The host apparatus 100 connects with an image forming apparatus 200 through a wired/wireless network or a local proximity network and communicates data with at least one image forming apparatus 200. The host apparatus 100 may be a personal computer (PC), a server, etc. The image forming apparatus 200 may be achieved by a printer, a copying machine, a multifunction peripheral having two or more functions, etc.

As illustrated in FIG. 1, the host apparatus 100 includes a user interface 110, a display unit 120, a storage unit 130, a communication unit 140, and a controller 150.

The user interface 110 may provide and receive one or more input selections from a user. Specifically, a user selects at least one capture area 22 (refer to FIG. 2) on a web page screen 20 (refer to FIG. 2) through the user interface 110, and edits a printing page 32 (refer to FIG. 2) including the capture area. Further, a user may input a command of printing the edited printing page 32 through the user interface 110. The user inputted commands, the selections made in capture area 22, and the edits made to the printing page 32 may be received by the user interface 110.

The user interface 110 may include a keyboard, a mouse, a touch panel, etc. or any other suitable input device provided as an input unit of the host apparatus 100, and may include a graphic user interface (GUI) generated by execution of a driver or a separate application and displayed to be selectable by a user on the display unit 120. Selections made by a user via the GUI may be received by the user interface 110. For example, as illustrated in FIGS. 2 to 7, the user interface 110 may include a web-page print menu button 21 displayed on a toolbar of the web page screen 20, a menu item button 31a of a scrap board 30, a context menu 24 displayed, for example, as a right button of the mouse is selected, a menu item toolbar 41 in a full screen 40 of the scrap board, a preview menu 25 of the web page screen 20, a menu item toolbar 51 of a preview screen 50, a layout selection button 60, etc.

The display unit 120 displays the web page screen 20 including the scrap board 30 (or a scrap book).

Figure 2:
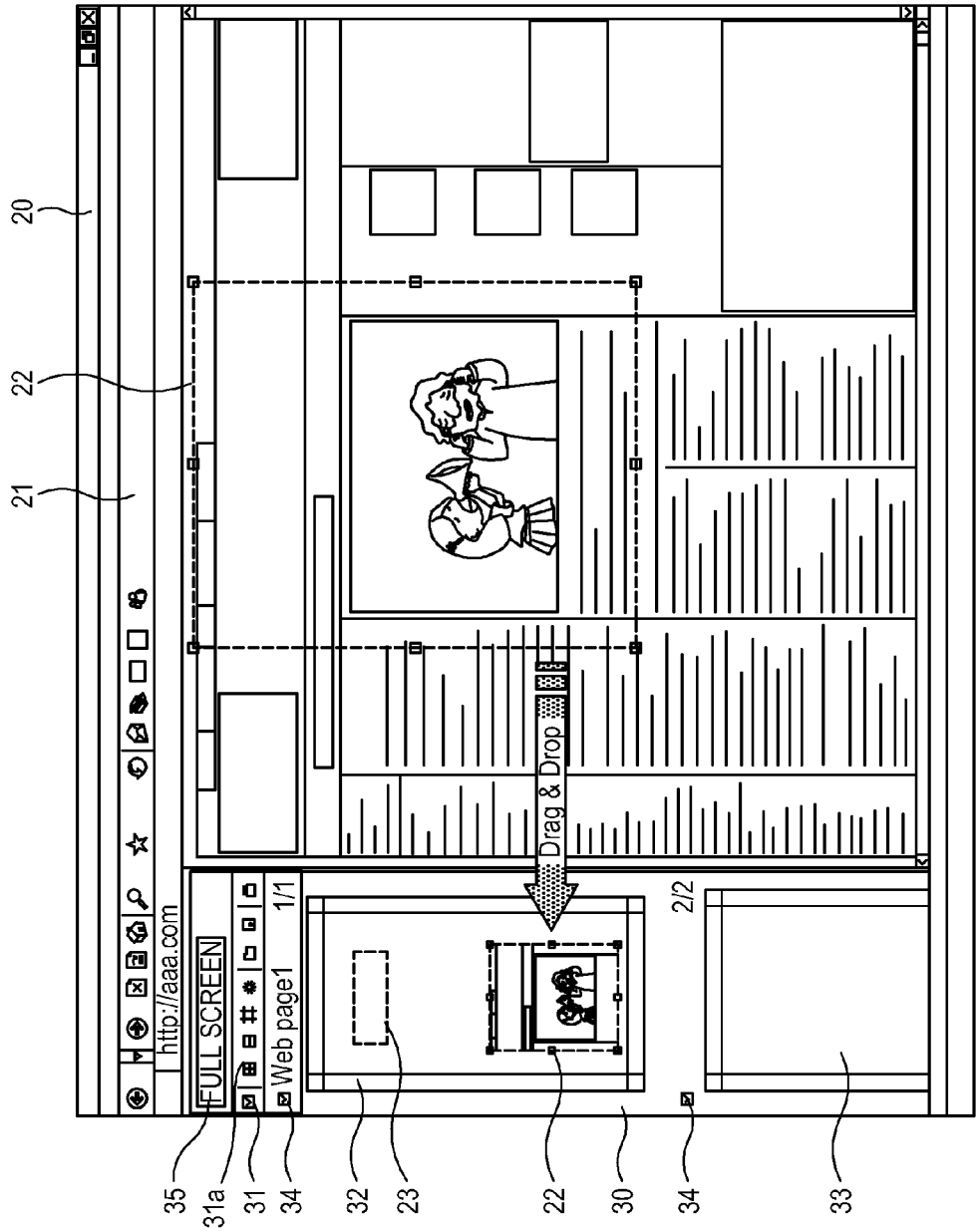
FIGS. 2 and 3 illustrate web page screens according to an exemplary embodiments of the present general inventive concept.
Figure 3:
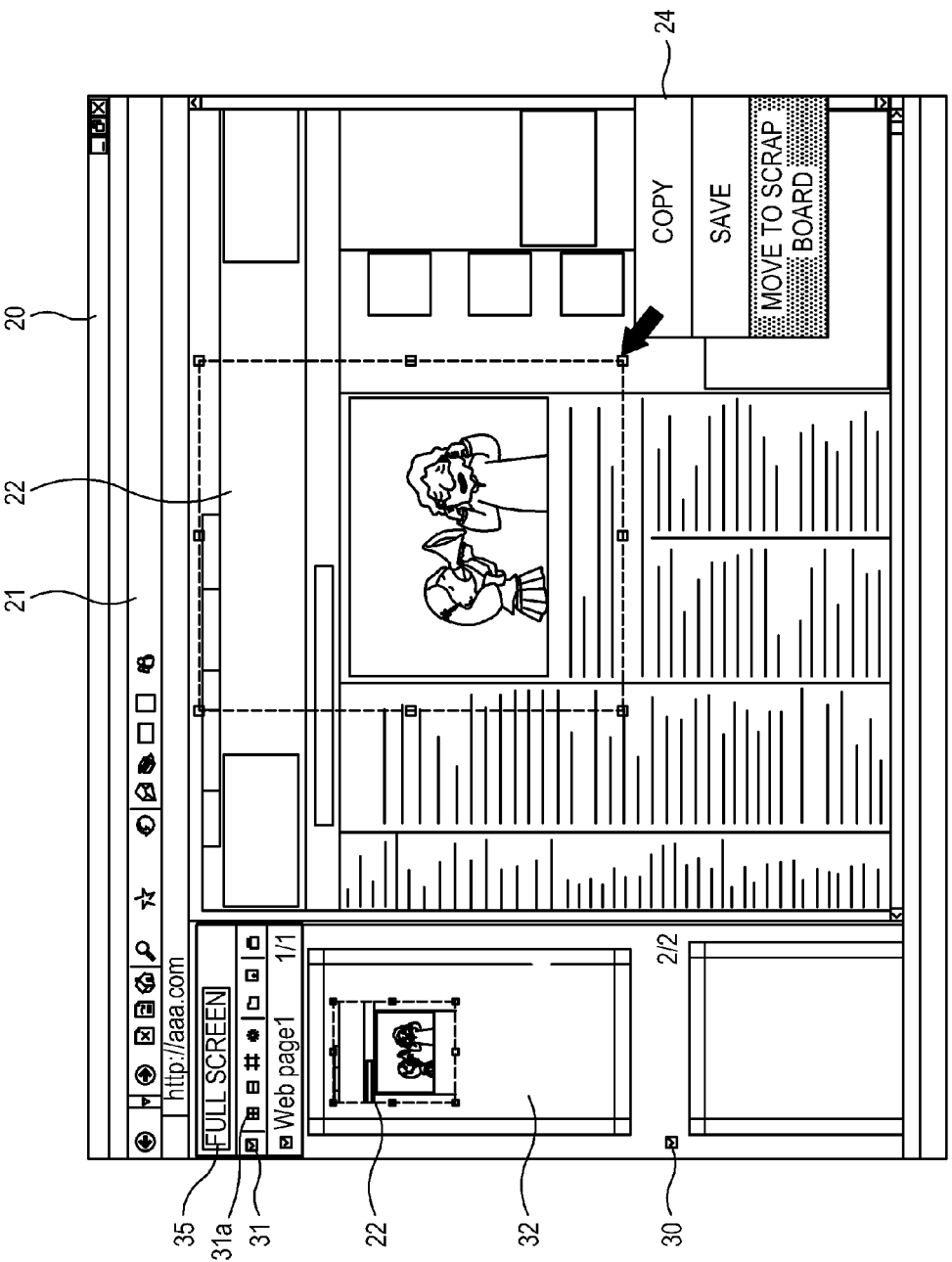

FIGS. 2 and 3 illustrate screens of a web page according to exemplary embodiments of the present general inventive concept.

Referring to FIGS. 2 and 3, if a user selects the web-page print menu button 21 in the toolbar on the web page screen 20 through the user interface 110, the display unit 120 displays the scrap board 30 in an area (e.g., a left side) of a web browser by a plug-in manner, or in any other suitable manner. The scrap board 30 is provided by dividing the screen of the display unit 120 where the web page is displayed, and a user may edit the capture area 22 in the scrap board 30 without any window generated by a separate application or program. The capture area 22 may be one or more selected areas by a user to be edited and/or printed. That is, one or more areas of the web page screen 20 may be, for example, selected, dragged, and dropped by the user with the user interface 110 into the scrap board 30.

The scrap board (30) may be hidden according to a user's selection. Also, the display unit 120 may change a pointer shape of the mouse into "+," or any other suitable symbol, thereby informing a user that a web page printing mode is selected.

The display unit 120 may display the selected capture area 22 as distinguished from a background area of the web page screen 20 excluding the capture area 22 if at least one capture area 22 is selected on the web page screen 20 through the user interface 110.

That is, a user may select the capture area 20 by selecting a point on the web page screen 20 and dragging it to another point using the user interface 110 (e.g., a mouse or the like). The selected capture area 22 may be surrounded with a boundary line such as a dotted line or the like, so that a user can recognize the area as the selected area from the other images in the web page screen 20. Thus, a user can designate the selected capture area 22 and adjust the size thereof using the user interface 110 (e.g., a mouse, etc.).

The display unit 120 may shade the background area of the web page screen 20 such that the web page screen is shaded with the exception of the selected capture area 22, so that a user can easily recognize the selected capture area 22. For example, the display unit 120 may make the background area dim, darker, or transparent, or distinctively change the capture area 22 or the background area in color, so as to distinguish the selected capture area 22 from the other areas of the web page screen 20.

Referring to FIG. 2, a user selects the capture area 22 on the web page screen 20 with the user interface 110 (e.g., the mouse) by dragging and dropping, thereby moving the selected capture area 22 to the scrap board 30.

As illustrated in FIG. 3, "move to the scrap board" is selected in the context menu 24 displayed when clicking a right button of the mouse or by receiving any other similar command with the user interface 110 in the state that the capture area 20 is selected and dragged by the mouse, thereby moving the selected capture area 22 to the scrap board 30.

Referring to FIGS. 2 and 3, the selected capture area 22 is added to a page area 32 of the scrap board 30.

The host apparatus 100 may capture the capture area selected by a user. The captured image area may capture image data, rather than a unit of a hyper text markup language (HTML) object having a stack structure. As the capture area is captured as an image or image data, there is no restriction on selecting the capture area 22. For example, the selection can be performed across a HTML tag or even a portion of an image, a flash animation, a moving picture, or any other text, image, icon, or data displayed in the in the web page screen 20 as illustrated in FIGS. 2 and 3.

Referring to FIGS. 2 and 3, the scrap board 30 includes the page area 32 including the printing page (e.g., printing page 32) with at least one capture area (e.g., capture area 22), and a menu area 31 including at least one menu item for editing the printing page (e.g., printing page 32) by disposing and/or arranging one or more capture areas in the printing page.

The menu area 31 includes at least one button (e.g., menu item button 31a) that corresponds to a check box, radio button, or other selectable item to select one or more printing pages, adding a page, deleting a page, print settings, open, save (including save as), and printing. The page area 32 may include a plurality of capture areas 22 and 23 as illustrated in FIG. 2. The menu area 31 may include a check box 34 or any other suitable selectable item to select whether to individually print the printing pages 22 and 23. The page area 32 may also include a button 35, that when selected via the user interface 110, may display a full screen. The page area 32 may also include a button 60 (illustrated in FIG. 7), that when selected via the user interface 110, may display selectable layout options for a user for arranging a plurality of capture areas in a printing page.

A user may select one or more of the buttons of the menu area 31, and may edit the printing page including at least one capture area 22.

In more detail, a user may edit the printing page so as to change a title of the printing page. That is, the name of the web site corresponding to the capture areas 22 and 23 initially added to the corresponding printing page may be designated as the title of the printing page, and the title of the printing page may be selectively changed by a user.

A user may select the corresponding button of the menu area 31 to thereby perform one or more editing functions such as: adding or deleting a printing page; changing a printing order; changing a margin; adding, modifying or deleting a head/tail; adjusting the size of the capture areas 22 and 23; adding or deleting the capture area 22 and 23; adding, modifying or deleting a text; drawing a line; drawing a figure; filling at least a portion of the printing page 22 with a color; canceling a color, deleting an image; reordering (bring forward, bring to front, send backward, send to back) an image; rotating an image (e.g., rotating the image in a clockwise or counterclockwise direction), etc.

The display unit 120 may display the margin in each printing page according to a user's selection. The user may edit the margin of the printing page to increase or decrease the margin size with the user interface 110.

The menu area 31 may include an undo-button to cancel or reverse an editing job to one step before, and a redo-button to cancel the undoing job, i.e., do the editing job again, to provide increased convenience and editing functionality to the user.

The display unit 120 may include a liquid crystal display (LCD), a driver (not illustrated) to drive the LCD, etc.

At least one printing page edited as described above may be stored in the storage unit 130 as a file having a predetermined format. The file stored in the storage unit 130 may be an image file having a format such as bmp, tiff, jpg, etc. or a job file having a predetermined format (e.g., w2p).

If the printing page is stored as the job file, a user may select the open-button of the menu area 31 with the user interface 110 to load the stored job file and to edit the job file in the state that the display unit 120 displays the printing page corresponding to the job file.

Further, if a plurality of printing pages are displayed in the scrap board 30, a user may selectively store one or more printing pages in the storage unit 130.

The storage unit 130 may include an internal storage medium such as a hard disk drive (HDD), an external or portable storage medium such as a universal serial bus (USB) memory and a memory card (a memory stick, a compact flash (CF) card, a multimedia card (MMC)). The storage unit 130 may be any suitable internal or external digital storage device.

The host apparatus 100 includes the communication unit 140 to communicate via a wired and/or wireless communication link with one or more devices, including at least one image forming apparatus 200. Specifically, if the communication unit 140 receives a command of printing the printing page including at least one capture area from the controller 150 and/or the user interface 110, the communication unit 140 transmits printing data corresponding to the edited printing page (e.g., printing data from the storage unit 130) to the image forming apparatus 200. If the plurality of printing pages are displayed on the scrap board 30, a user may select one or more of the printing pages to be printed with the user interface 110.

The image forming apparatus 200 receives the printing data from the host apparatus 100 and prints based on the received printing data.

The communication unit 140 may include a wire/wireless communication module connectable with the image forming apparatus 200 locally or through a network based on a predetermined protocol, or a universal serial bus (USB) port connectable with a portable storage medium such as a USB memory.

The controller 150 controls the display unit 120, the communication unit 140, and the storage unit 130 of the host apparatus 100. For example, the controller 150 may receive input from the user interface 110, and control the display unit 120 the storage unit 130, and/or the communication unit 140 according to the received input from the user interface 110.

The controller 150 may control the display unit 120 to display the scrap board 30 including at least one printing page on an area of the web page screen 20 if the web-page print menu button 21 is selected through the user interface 110.

If at least one capture area 22 is selected on the web page screen 20 through the user interface 110, the controller 150 controls the display unit 120 to display the selected capture area 22 as distinguished from a background area of the web page screen 20 excluding the capture area 22. Also, the controller 150 controls the display unit 120 to display at least one selected capture area 22 on the scrap board 30.

If the controller 150 receives a command to edit the printing page displayed on the scrap board 30 through the user interface 110, and controls the display unit 120 to display the edited printing page on the scrap board 30.

A user may select to move to the corresponding web site by selecting the capture areas 22 and 23 on the scrap board 30. In more detail, if predetermined capture areas 22 and 23 are selected on the scrap board 30 through the user interface 110, the controller 150 controls the display unit 120 to display the web pages corresponding to the web sites linked to the corresponding capture areas 22 and 23. Here, the controller 150 may display the corresponding web site on a new window or the currently open window.

The controller 150 may control the display unit 120 to display the printing page edited by a user's selection as a full screen. For example, a user may select the full screen button 35 on the scrap board 30 of FIGS. 2 and 3 with the user interface 110 and view the printing page as the full screen.

Figure 4:
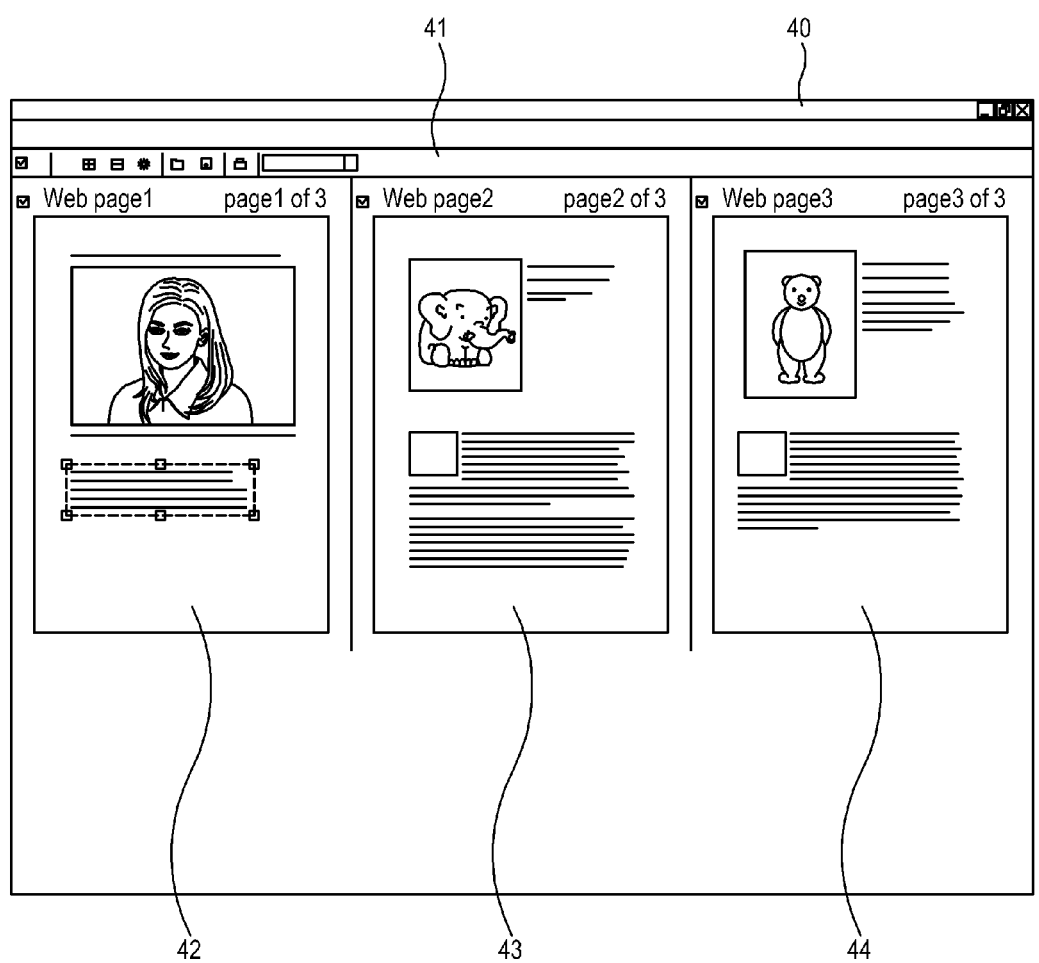
FIG. 4 illustrates a full screen of a printing page according to an exemplary embodiments of the present general inventive concept.

FIG. 4 illustrates a full screen 40 of a printing page according to exemplary embodiments of the present general inventive concept.

As illustrated in FIG. 4, the full screen 40 of the printing page includes a menu item toolbar 41 including at least one button to receive a user's command, and at least one printing page 42, 43, 44. Also, the full screen 40 may have a page name corresponding to each printing page 42, 42, 44.

The menu item toolbar 41 includes at least one menu item button corresponding to adding a page, deleting a page, print settings, open, save, print, etc. The menu item toolbar 41 may include a drop-down list in which the number of pages to be displayed within one screen is selectable. In the host apparatus 100, a user may select the number of pages illustrated in FIG. 4 within one window as one among one, two and three.

Through the full screen illustrated in FIG. 4, a user may carry out various edits via the user interface 110 such as: adding or deleting the printing pages 42, 43, 44; changing a printing order; changing a margin; adding, modifying or deleting a head/tail; adjusting the size of the capture areas 22 and 23; adding or deleting the capture area 22 and 23; adding, modifying or deleting a text; drawing a line; drawing a figure; filling with a color; canceling a color, deleting an image; reordering (bring forward, bring to front, send backward, send to back) an image; rotating an image, etc.

The controller 150 controls the display unit 120 to display the printing page edited corresponding to the received editing command input through the user interface 110 on the full screen 40 of FIG. 4.

The host apparatus 100 in this embodiment employs the full screen 40 of FIG. 4 displayed more largely than the scrap board 30 of FIGS. 2 and 3, so that a user can more easily ascertain edited results. Thus, the host apparatus 100 is convenient for a user to edit the printing page.

In the meantime, the controller 150 may control the display unit 120 to display the preview screen 50 providing a preview function with respect to the web page.

Figure 5:
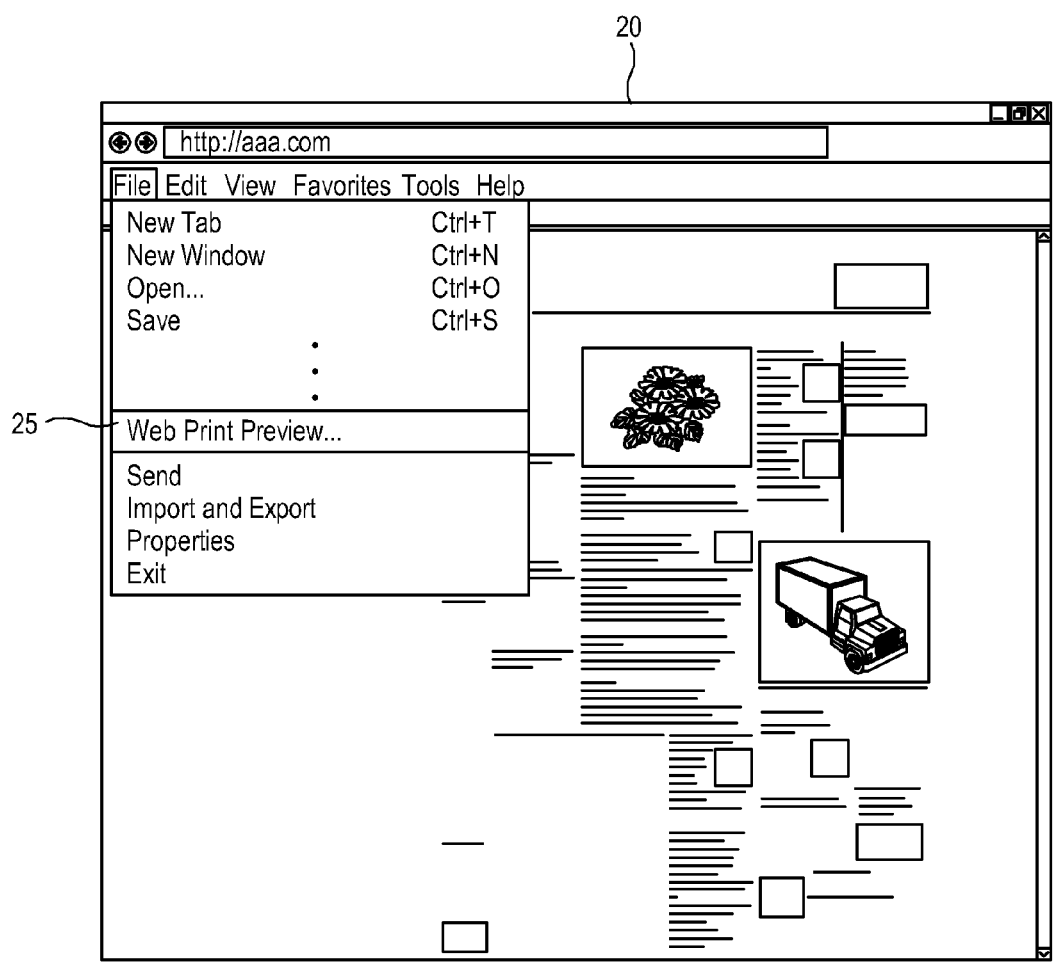
FIGS. 5 and 6 are views illustrating a preview screen of a web page according to exemplary embodiments of the present general inventive concept.
Figure 6:
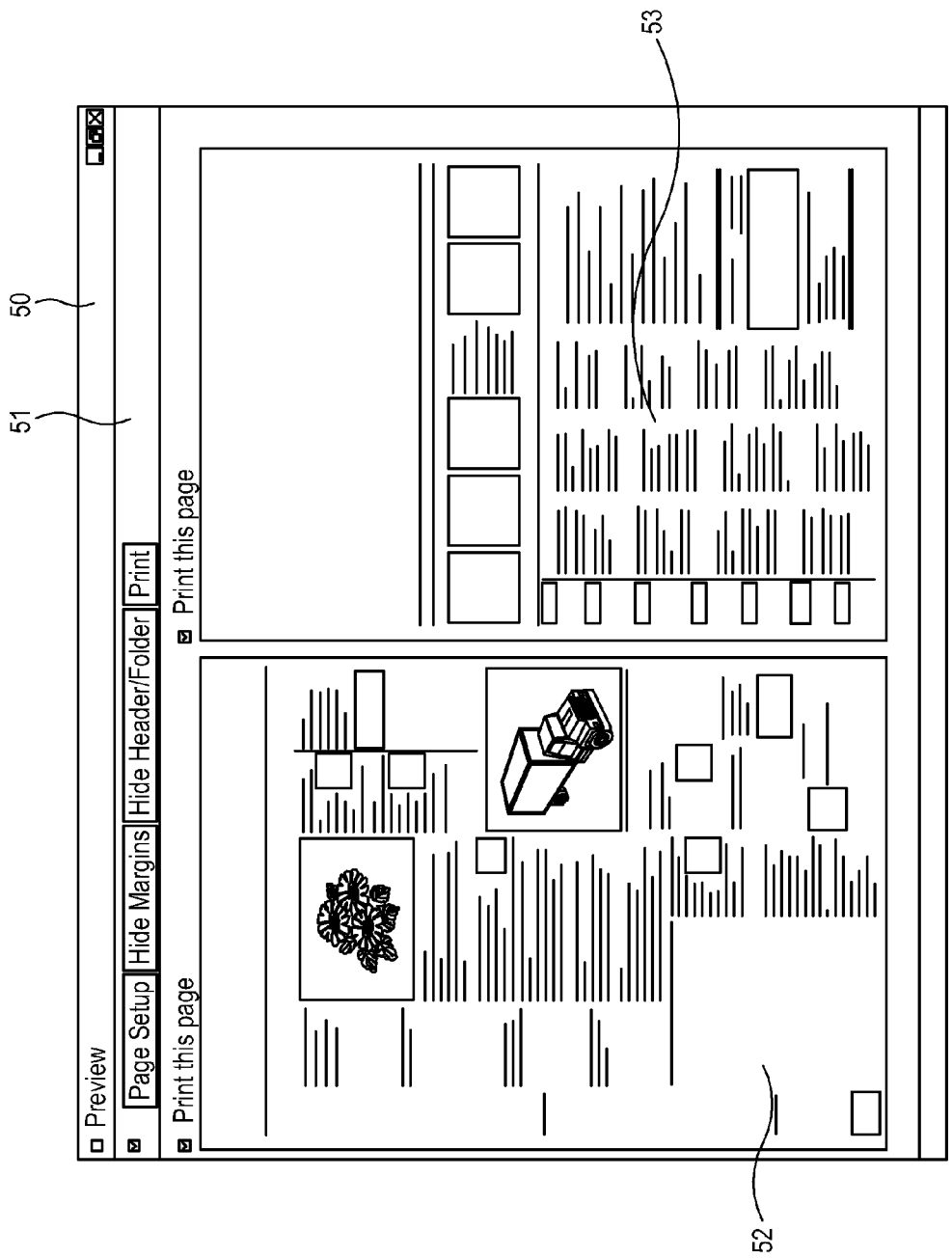

FIGS. 5 and 6 are views for explaining a preview screen 50 of a web page according to exemplary embodiments of the present general inventive concept.

As illustrated in FIG. 5, a user may select a preview item 25 on the web page screen 20.

The controller 150 controls the display unit 120 to display the preview screen 50 as illustrated in FIG. 6 in response to the preview item 25 selected in FIG. 5.

Specifically, the preview screen 50 of FIG. 6 may includes the menu item toolbar 51 including at least one button to receive a user's command, and at least one full screen web page 52, 53. Also, the preview screen 50 may further include a check box to select whether to perform printing according to the web pages 52 and 53.

The menu item toolbar 51 includes at least one menu item button corresponding to page settings, a margin hide/view, a header hide/view, print, rate of extension/reduction, zoom in/out, etc. The menu item toolbar 51 may further include a check box for selecting all web pages 52 and 53. According to the host apparatus 100 in this embodiment, a user may select the number of pages illustrated within one window as one among one, two and three.

The controller 150 may perform a screen capture using scrolling the full screen with respect to the web pages 52 and 53 in response to a user's selection of the preview item 25 as illustrated in FIG. 5. Here, the controller 150 may control the display unit 120 to display the web page screen 52, 53 by adjusting the margin thereof in order to minimize a cut portion in the web page screen 52, 53, or by resetting the web page screen 52, 53 to be reduced for the printing page.

Through the foregoing preview function, the host apparatus 100 may print the web page fully without omission.

According to exemplary embodiments of the present general inventive concept, the host apparatus 100 may select a layout with respect to the printing page, and print the printing page edited according to the selected layout. For example, a layout may be selected by the host apparatus 100 based at least in part from input received from the user interface 110.

Figure 7:
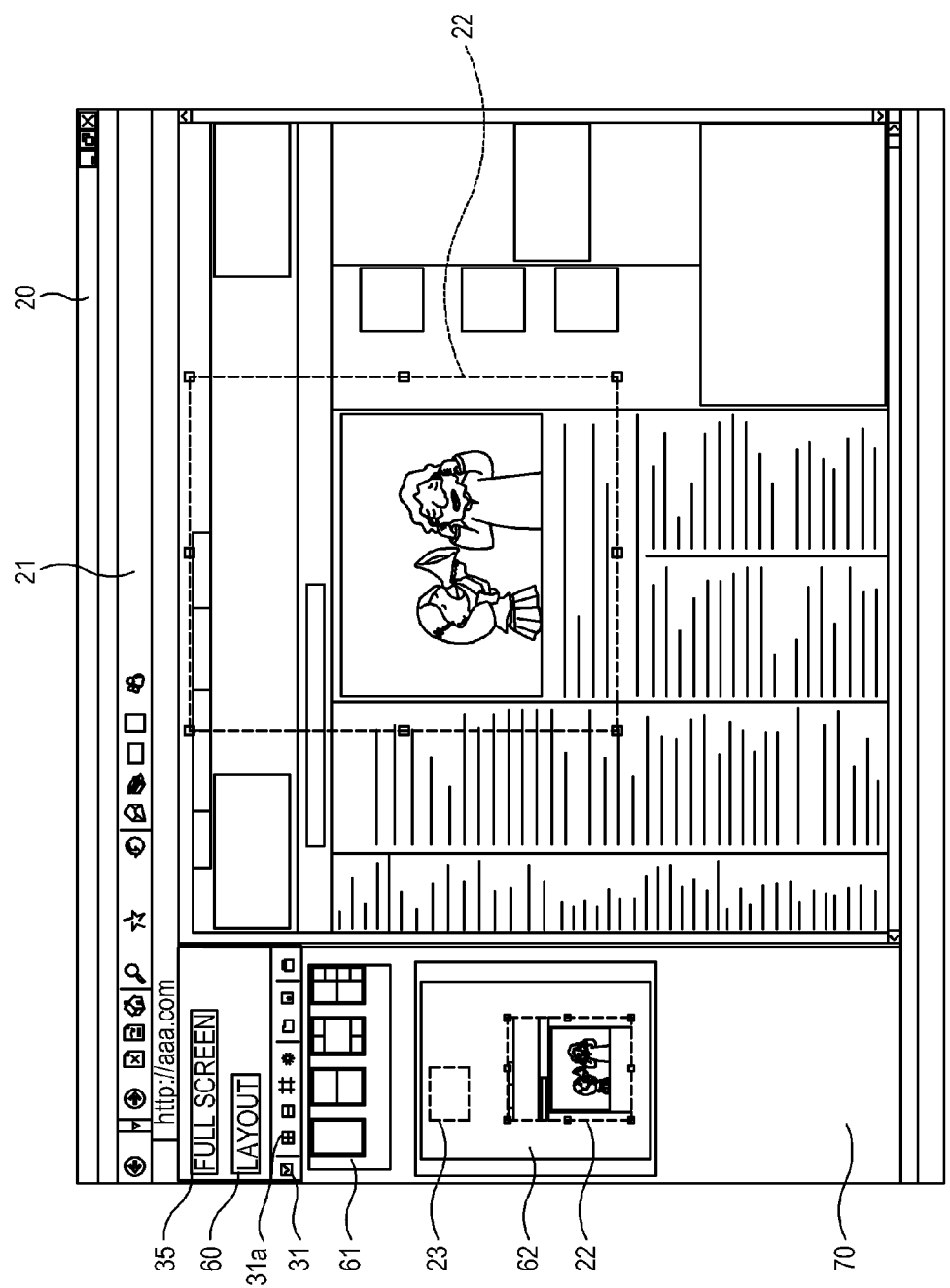
FIG. 7 illustrates a layout selecting window and a printing page to which a layout is applied according to exemplary embodiments of the present general inventive concept.

FIG. 7 illustrates a layout selecting window 61 and a printing page 62 to which a layout is applied according to exemplary embodiments of the present general inventive concept.

As illustrated in FIG. 7, a user may select with the user interface 110 the layout button 60 on the scrap board 30 and select whether to apply the layout to the printing page.

If a user selects the layout to be applied to the printing page, the controller 150 controls the display unit 120 to display the layout selecting window 61 in which at least one layout is selectable.

When one of at least one layout is selected through the user interface 110, the controller 150 controls the display unit 120 to display the printing page 62 to which the selected layout is applied. Here, the layout provided to a user may be previously stored in the storage unit 130.

In addition to providing one or more layouts, the host apparatus 100 may provide selections to a user to directly design the layout.

A user may select with the user interface 110 at least one capture area 22 on the web page screen 20, and may add the selected capture area 22 to the printing page 62 to which the layout is applied, using the drag-and-drop or the context menu 24. A user may edit the printing page 62 to which layout is applied through the menu item button of the menu area 31, and correspondingly the controller 150 controls the display unit 120 to display the edited printing page 62.

Thus, a user may edit the printing page through the one or more applied layouts.

The host apparatus 100 may display an application execution menu 70 on an area (e.g., a bottom as illustrated in FIG. 7) of the web page screen 20. A user may select the displayed application execution menu 70 and executes at least one edited capture area 22. Here, the execution may include that the host apparatus sends the edited captured area 22 via E-mail, fax, web, FTP, or the host apparatus save and/or prints the edited capture area 22.

The application execution menu 70 includes buttons corresponding to at least one of send to E-mail, send to fax, send to web, send to FTP, save, print, etc., and a user selects the corresponding button with the user interface 110 to transmit the printing page 32, 33, 62 including at least one capture area 22, 23 as an attached file such as E-mail, fax, etc. to one or more communicatively coupled devices through the communication unit 140; or store it as a predetermined image file in a web, a file transfer protocol (FTP) server, the storage unit 130 provided in the host apparatus 100, etc. A user may select a print button of the application execution menu 70 to convert the printing page 32, 33, 62 into printing data of a predetermined printing language, so that the printing data can be transmitting to the image forming apparatus 200 through the communication unit 140.

The host apparatus 100 may provide a selectable button in the application execution menu 70 so as to be linked to an application such as an MS-word, Excel, PDF, MS Visio, Notepad, etc.

A user may select the application execution menu 70 and edit the printing page 32, 33, 62 on the executed application. If a button corresponding to the PDF is selected, the printing page 32, 33, 62 is converted into a file having a PDF format based on a text. The text may be searched through a text searching menu. The converted PDF file may be stored in the storage unit 130 by a user's selection via the user interface 110 or as a temporary file.

The host apparatus 100 may use the scrap board 30 to edit and print the web pages. The host apparatus 100 may provide selectable functions related to the full screen, the preview, the layout, the link to the application, etc., for a user to edit the printing page.

In the host apparatus 100 with the above-described configuration, a web page printing method according to exemplary embodiments of the present invention will be described below with reference to FIG. 8.

Figure 8:
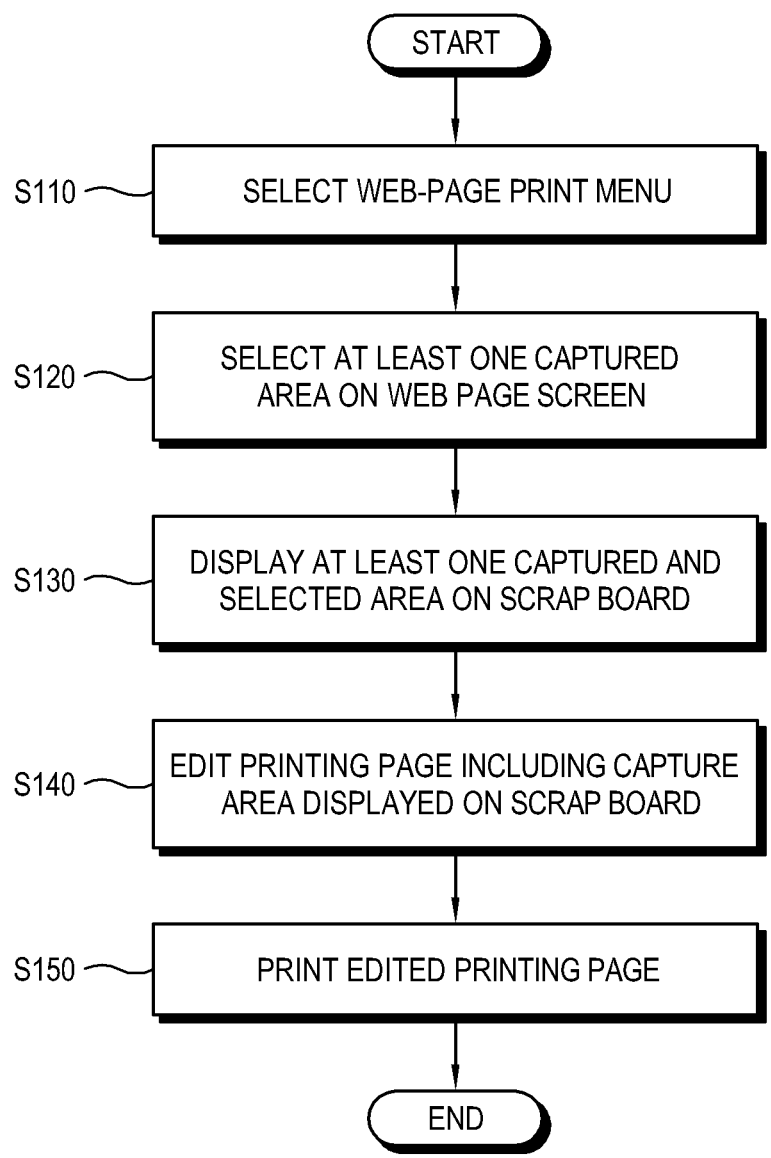
FIG. 8 is a flowchart illustrating a web page printing method according to exemplary embodiments of the present general inventive concept.

As illustrated in FIG. 8, at operation S110 a user may select the web-page print menu button 21 provided in the toolbar on the web page screen 20 through the user interface 110 of the host apparatus 100. In the operation S110, if the web-page print menu 21 is selected, the controller 150 may control the display unit 120 to display the scrap board 30 in an area (e.g., a left side) of the web browser by a plug-in manner, and change a pointer shape of the mouse into "+," or other suitable symbol, thereby informing a user that the web page printing mode is selected.

At operation S120 a user selects at least one capture area 22 on the web page screen 20 through the user interface 110. The controller 150 captures the selected capture area 22 as an image, and controls the display unit 120 to display the selected capture area 22 as distinguished from the background area.

At operation S130, the host apparatus 100 displays at least one capture area 22 selected in the operation S120 on the scrap board 30. A user may select the layout to be applied to the printing page 32, 33.

At operation S140, a user may edit the printing page displayed in the operation S130 on the scrap board 30. A user may edit the printing page by selecting the full screen 40, and may edit the whole web page screen 20 by selecting the preview screen 50. The edited printing page may be stored as a file having a predetermined format or transmitted to one or more devices communicatively coupled to the host apparatus 100. The edited printing page may be run by one or more linked compatible applications.

At operation S150 the host apparatus 100 prints the printing page edited in the operation S140.

The host apparatus 100 may edit the web page, and the image forming apparatus may print the edited web page, but exemplary embodiments of the present general inventive concept are not limited thereto. Alternatively, a web page editor may be provided in the image forming apparatus 200, and therefore the image forming apparatus 200 can edit and print the web site.

As described above, the present general inventive concept provides a host apparatus connecting with an image forming apparatus and a web page printing method thereof, for a user to select, edit and print a desired area from a web page.

Further, it is easy for a user to ascertain an edited state of a web page at a glance through a screen division without one or more separate operations such as selecting a preview or the like, and edit the web page as desired.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several exemplary embodiments of the present general inventive concept have been illustrated and described, it will be appreciated by those skilled in the art that changes may be made in these embodiments without departing from the principles and spirit of the present general inventive concept, the scope of which is defined in the appended claims and their equivalents.

What is claimed is:

1. A non-transitory computer readable medium storing a program, including instructions, which when executed with a web-browser application by a computer, causes the computer to perform a method comprising:

executing the web-browser application with the program;

displaying a browser window of the web-browser application, the browser window displaying a web page including web serviced contents;

receiving a user input to select an area of the web page to be copied to a printing page;

displaying the selected area having a border so as to distinguish the selected area from a background area of the web page, a size of the selected area is adjustable via user input which adjusts at least one portion of the border;

receiving a selection from the user to copy the selected area, and capturing the selected area of the web page as image data; and displaying the captured image data in a first section of the web-browser application different from a second section of the web-browser application displaying the web page containing the web serviced contents, wherein the captured image data in the printing page is capable of being stored as a printable document.

2. The non-transitory computer readable medium of claim 1, wherein the method further comprises:

adding the captured image data to the printing page; and displaying the printing page in a full screen mode that includes a menu area having at least one selectable menu item to edit the printing page including the captured image data.

3. The non-transitory computer readable medium of claim 2, wherein the method further comprises:

receiving a user input to print one or more of the printing pages displayed in the full screen mode.

4. The non-transitory computer readable medium of claim 2, wherein the method further comprises:

receiving a user input to store the printing page as the printable document in a portable document format (PDF).

5. The non-transitory computer readable medium of claim 2, wherein the method further comprises:

receiving a selection to hide the first section of the browser window from view;

when the first section of the browser window is hidden from view, displaying only the second section of the browser window.

6. A non-transitory computer readable medium storing a program, including instructions, which when executed with a web-browser application by a computer, causes the computer to perform a method comprising:

receiving a first user input to designate an area of a web page displayed in a browser window of the web-browser application to be copied to a printing page, the designated area being distinguished from the web page by an adjustable border, where the first user input adjusts at least one portion of the border to change the designated area;

receiving a selection from the user to copy the designated area, and capturing an image of the designated area of the web page according to the first user input;

generating the printing page using an image data of the captured image of the designated area of the web page;

receiving a second user input to change a location of the captured image from a first location to a second location of the printing page; and editing the printing page including the captured image of the designated area of the web page according to the second user input.

7. The non-transitory computer readable medium of claim 6, wherein the method further comprises:

displaying the printing page as a print preview image in a first section of the browser window different from a second section of the browser window displaying the web page.

8. The non-transitory computer readable medium of claim 6, wherein the method further comprises:

displaying the printing page as a print preview image in a full screen mode.

9. The non-transitory computer readable medium of claim 6, wherein the method further comprises:

generating an image data of the captured image of the designated area of the web page.

10. The non-transitory computer readable medium of claim 7, wherein the method further comprises:

receiving a selection to hide the first section of the browser window from view;

when the first section of the browser window is hidden from view, displaying only the second section of the browser window.

11. The non-transitory computer readable medium of claim 9, wherein the method further comprises:

adding the capture image data to the printing page; and displaying the printing page including the captured image data as a print preview image in a full screen mode and a menu area having at least one selectable menu item to edit the printing page including the captured image data.

12. The non-transitory computer readable medium of claim 11, wherein the method further comprises:

receiving a user input to print the printing page displayed in the full screen mode.

13. A non-transitory computer readable medium storing a program, including instructions, which when executed with a web-browser application by a computer, causes the computer to perform a method comprising:

receiving a selection of at least a portion of a web page displayed in a first window of the web-browser application, the selected portion being distinguished from the displayed web page with an adjustable border, a size of the selected portion of the web page being adjusted when the user adjusts at least a portion of the border;

receiving a selection from the user to copy the selected portion, and capturing the selected portion of the web page as image data to be copied to a printing page; and displaying the selected portion of the web page in a second window of the web-browser application according to a received selection.

14. The non-transitory computer readable medium of claim 13, wherein the method further comprises:

adding the captured image data to the printing page; and displaying the printing page in a full screen mode that includes a menu area having at least one selectable menu item to edit the printing page including the captured image data.

15. The non-transitory computer readable medium of claim 14, wherein the method further comprises:

receiving a user input to print the printing page displayed in the full screen mode.

16. The non-transitory computer readable medium of claim 14, wherein the method further comprises:

receiving a user input to store the printing page as the printable document in a portable document format (PDF).

17. The non-transitory computer readable medium of claim 1, wherein the program is executed as a plug-in of the web-browser application.

18. The non-transitory computer readable medium of claim 1, wherein the first section and the second section are displayed within of the same browser window.

19. The non-transitory computer readable medium of claim 6, wherein the program is executed as a plug-in of the web-browser application.

20. The non-transitory computer readable medium of claim 13, wherein the program is executed as a plug-in of the web-browser application.

* * * * *